(12) United States Patent
Gregard et al.

(10) Patent No.: US 9,778,531 B2
(45) Date of Patent: Oct. 3, 2017

(54) CONTACTING OF ELECTROCHROMIC DEVICES

(71) Applicant: CHROMOGENICS AB, Uppsala (SE)

(72) Inventors: Greger Gregard, Uppsala (SE); Richard Karmhag, Uppsala (SE)

(73) Assignee: CHROMOGENICS AB, Uppsala (SE)

( * ) Notice: Subject to any disclaimer, the term of this patent is extended or adjusted under 35 U.S.C. 154(b) by 0 days.

(21) Appl. No.: 14/906,398

(22) PCT Filed: Jul. 23, 2014

(86) PCT No.: PCT/SE2014/050902
§ 371 (c)(1),
(2) Date: Jan. 20, 2016

(87) PCT Pub. No.: WO2015/016764
PCT Pub. Date: Feb. 5, 2015

(65) Prior Publication Data
US 2016/0161818 A1    Jun. 9, 2016

(30) Foreign Application Priority Data

Jul. 29, 2013 (SE) .................................... 1350916

(51) Int. Cl.
*G02F 1/15* (2006.01)
*G02F 1/155* (2006.01)
(Continued)

(52) U.S. Cl.
CPC ............... *G02F 1/155* (2013.01); *B23K 1/06* (2013.01); *G02F 1/13439* (2013.01); *G02F 1/153* (2013.01); *G02F 1/13458* (2013.01)

(58) Field of Classification Search
CPC ...... G02F 1/155; G02F 1/13439; G02F 1/153; G02F 1/13458; B23K 1/06
(Continued)

(56) References Cited

U.S. PATENT DOCUMENTS 4,558,924 A * 12/1985 Sautter ................. G02F 1/1533
359/272
4,851,308 A  7/1989 Akhtar
(Continued)

FOREIGN PATENT DOCUMENTS

CN    101707892 A    5/2010
CN    102341750 A    2/2012
(Continued)

OTHER PUBLICATIONS upplementary European Search Report dated Mar. 13, 2017 from corresponding European Application No. 14832244.9.

*Primary Examiner* — Tuyen Tra
(74) *Attorney, Agent, or Firm* — Porter Wright Morris & Arthur LLP

(57) ABSTRACT

An electrochromic device (1) comprises an electrochromic layered structure (10) having a first substrate sheet (21), a second substrate sheet (22), a first (23) and a second (24) electron conducting layer at least partially covering a respective substrate sheet, an electrochromic layer (25) and a counter electrode layer (26) at least partially covering a respective electron conducting layer and an electrolyte layer (30) laminated between and at least partially covering the first electrochromic layer and the counter electrode layer. The electrochromic layered structure also has an area (51, 52) in which the electrochromic layer or the counter electrode layer is not covered by the electrolyte layer. An electrode (41, 42) is soldered to the respective electron conducting layer through the electrochromic layer or the counter electrode layer.

20 Claims, 2 Drawing Sheets

(51) Int. Cl.
*B23K 1/06* (2006.01)
*G02F 1/153* (2006.01)
*G02F 1/1343* (2006.01)
*G02F 1/1345* (2006.01)

(58) Field of Classification Search
USPC .......................... 359/265–275, 900; 345/105
See application file for complete search history.

(56) References Cited

U.S. PATENT DOCUMENTS

| | | | |
|---|---|---|---|
| 5,724,187 A | 3/1998 | Varaprasad et al. | |
| 5,886,687 A * | 3/1999 | Gibson | G06F 3/044 178/18.06 |
| 7,872,791 B2 * | 1/2011 | Karmhag | G02F 1/1533 359/265 |
| 2005/0195488 A1 | 9/2005 | McCabe et al. | |
| 2008/0266642 A1 | 10/2008 | Burrell et al. | |
| 2009/0073085 A1 * | 3/2009 | Saneto | H05K 9/0096 345/36 |
| 2011/0317243 A1 | 12/2011 | Piroux et al. | |
| 2012/0019889 A1 | 1/2012 | Lamine et al. | |

FOREIGN PATENT DOCUMENTS

| | | |
|---|---|---|
| CN | 102388340 A | 3/2012 |
| CN | 102460292 A | 5/2012 |
| JP | 62-14118 A | 1/1987 |
| NO | 2010/120537 A2 | 10/2010 |
| WO | 97/22906 A1 | 6/1997 |
| WO | 2008/013499 | 1/2008 |
| WO | 2008/013500 A1 | 1/2008 |
| WO | 2008/013501 A1 | 1/2008 |
| WO | 2008/147322 A1 | 12/2008 |
| WO | 2012/138281 A1 | 10/2012 |

\* cited by examiner

CONTACTING OF ELECTROCHROMIC DEVICES

TECHNICAL FIELD

The present invention relates in general to electrochromic devices and in particular to contacting of electrochromic devices.

BACKGROUND

Electrochromic devices are today used in widely different applications for enabling control of light transmission. Non-exclusive examples are helmet visors, windows on buildings or automotives, mirrors and goggles. In a typical non-self-erasing electrochromic device, a thin foil of stacked layers is used, incorporating conducting layers, electrochromic layers and an electrolyte layer. In certain embodiments, these layers are provided between two substrate sheets serving as main structural bodies of the electrochromic device. In order to change the transmittance of the device, a voltage is provided between two electron conducting layers. The voltage causes a charging of the electrochromic device, which in turn results in a transmittance change. The level of transmittance is preserved when the voltage is removed.

An important process step in manufacturing of electrochromic devices is the contacting of the electron conducting layers. Since the electrochromic device generally is very thin, so are the electron conducting layers. Contacting from the sides of the electrochromic device becomes practically impossible or at least very difficult to perform in a more or less automated manner. The typical approach for facilitating contacting is to let one substrate sheet with the associated electron conducting layer protrude outside the other substrate sheet in a direction along the extension of the generally sheet-shaped electrochromic device. The other substrate sheet and the other electron conducting layer are typically protruding at another portion of the device. Contacting of the electron conducting layers can then be performed at these protruding portions.

Contacting geometries have therefore to be determined in advance. The deposition of the electrochromic layers or counter electrode layers has to be excluded from such areas. Furthermore, during the lamination process, aligning of the substrate has to be performed in order to ensure that the areas intended for contacting do not become covered. Moreover, if the laminated EC laminate is going to be transported before the actual contacting is performed, the exposed areas may be damaged if not being properly protected.

Also, in different applications, electrochromic devices of varying geometrical shapes may be needed. The final shape may even not be known until just before the actual assembly. In such cases, it can be difficult to provide semi-manufactured electrochromic devices with a correct shape in advance, and it would be beneficial if the final shape of the electrochromic device could be cut out from a larger sheet of an electrochromic layered structure. In such cases, the provision of protruding parts appropriate for contacting becomes even more difficult.

SUMMARY

A general object of the present invention is to facilitate contacting of electrochromic devices. The object is achieved by methods and devices according to the enclosed independent patent claims. Preferred embodiments are defined by the dependent claims. In general words, in a first aspect, a method for producing an electrochromic device comprises providing of an electrochromic layered structure. The electrochromic layered structure has a first substrate sheet, a second substrate sheet, a first electron conducting layer at least partially covering the first substrate sheet, a second electron conducting layer at least partially covering the second substrate sheet, an electrochromic layer at least partially covering the first electron conducting layer, a counter electrode layer at least partially covering the second electron conducting layer, and an electrolyte layer laminated between and at least partially covering the first electrochromic layer and the counter electrode layer. The electrochromic layered structure has a first area in which the electrochromic layer is not covered by the electrolyte layer and/or a second area in which the counter electrode layer is not covered by the electrolyte layer. An electrode is, by use of ultra sound soldering, soldered to the first electron conducting layer in the first area through the electrochromic layer or to the second electron conducting layer in the second area through the counter electrode layer.

In a second aspect, an electrochromic device comprises an electrochromic layered structure. The electrochromic layered structure has a first substrate sheet, a second substrate sheet, a first electron conducting layer at least partially covering the first substrate sheet, a second electron conducting layer at least partially covering the second substrate sheet, an electrochromic layer at least partially covering the first electron conducting layer, a counter electrode layer at least partially covering the second electron conducting layer and an electrolyte layer laminated between and at least partially covering the first electrochromic layer and the counter electrode layer. The electrochromic layered structure also has a first area in which the electrochromic layer is not covered by the electrolyte layer and/or a second area in which the counter electrode layer is not covered by the electrolyte layer. A first electrode is soldered to the first electron conducting layer in the first area through the electrochromic layer and/or a second electrode is soldered to the second electron conducting layer in the second area through the counter electrode layer.

One advantage with the present invention is that it enables a more flexible manufacturing. Another advantage with the present invention is that it presents manufacturing well adapted to large-scale production. Other advantages are discussed more in connection with the different embodiments presented further below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

One approach to solve the problems of prior art is to first manufacture an electrochromic layered structure without uncovered areas intended for contacting and then in connection with the actual contacting removing a portion of one half-cell and underlying electrolyte to expose the inner surface of the opposite half-cell. By "half-cell" is here understood the part structure composed by a substrate sheet, an electron conducting layer and either an electrochromic layer or a counter electrode layer. The exposed inner surface of the opposite half cell thereby shows a surface covered with either an electrochromic layer or a counter electrode layer. These materials are typically porous oxides, e.g. WO or NiO, and typically poorly conducting.

The exposed areas of either an electrochromic layer or a counter electrode layer are unsuitable for contacting an electrode by simple mechanical means, such as clamping etc. Also thermal soldering will give poor results since the solder, due to surface tension, only wets the surface of the electrochromic layer or counter electrode layer and the electron conduction using the electrochromic layer or counter electrode layer is too poor.

However, since the electrochromic layer or counter electrode layer typically is deposited onto the electron conducting layer, e.g. Indium Tin Oxide (ITO), by sputtering techniques and in thin layers, at least in a macroscopic view, removal of the electrochromic layer or counter electrode layer without severely damaging the underlying electron conducting layer becomes very cumbersome. Mechanical removal techniques are in general too rough and chemically based methods are typical unpractical to perform in connection with contacting processes and requires typically additional protective measures to protect the rest of the device.

Figure 1:
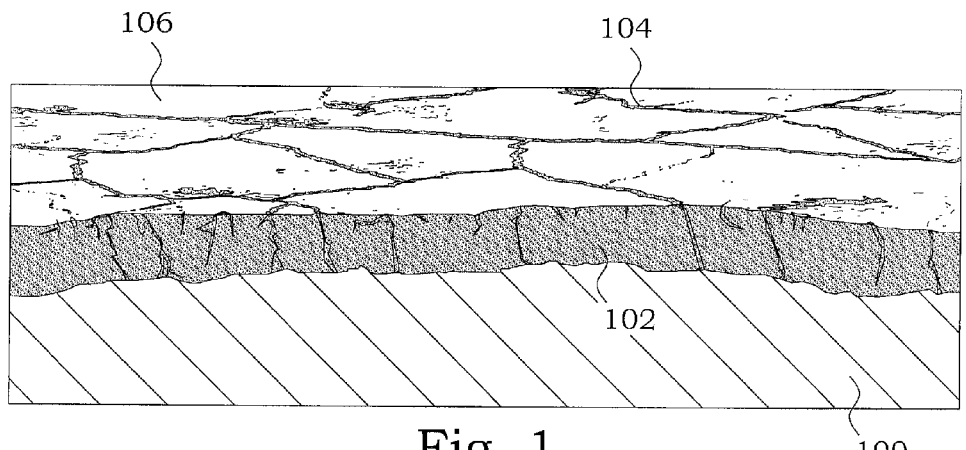
FIG. 1 is an illustration of an ITO surface partially covered by an electrochromic compound.

FIG. 1 illustrates an enlarged portion of an ITO surface 100 partially covered with an electrochromic oxide 106. The vertical portion 102 of the oxide is in the figure emphasized by an irregular hatching and the ITO surface 100 is given a linear hatching in order to make the figure more readable. The oxide is porous and the oxide surface is fractured 104. The oxide is poorly conducting. The same conditions are present at a counter electrode layer.

It has now been discovered that by applying ultrasonic soldering to a material such as electrochromic oxides, an electrical contact can nevertheless be established, i.e. through the poorly conducting oxide. The full understanding of the reasons and processes making this possible is not yet reached. It is experimentally challenging to try to investigate and verify such systems, since the thickness dimension ratios between e.g. the substrate or solder and the electrochromic oxides are very large. However, relatively well supported theories are developed.

With reference to FIG. 1, the cracks 104 in the oxide of the electrochromic or counter electrode layers typically penetrate all the way down through the oxide layer 102 down to the surface of the conductive ITO 100. Typical widths of the cracks 104 are up to 50 nm. However, such cracks 104 are in general too narrow to allow solder from a thermal soldering process to enter due to surface tension effects. At the contrary, during the ultrasonic soldering, the surface tension seems to be reduced. Cavities that are too small to be filled with thermally melted metal due to surface tension reasons, becomes fillable by use of ultrasonic soldering. When the surface tension of the solder material becomes low enough, the capillary forces of the narrow cracks starts to pull the solder through the cracks 104 and pores all the way down to the conductive ITO 100. Probably, the sound waves from the ultrasound soldering equipment also contribute to actively push down the solder into the cracks 104.

An electron conducting path is thereby created through the electrochromic oxide. Each crack or pore is typically very small, but the large numbers of pores and cracks together form an electrical connection having a reasonably low resistance. It is thus possible to contact the ITO layer through the electrochromic oxide by ultrasonic soldering without removing the entire electrochromic oxide.

Figure 2:
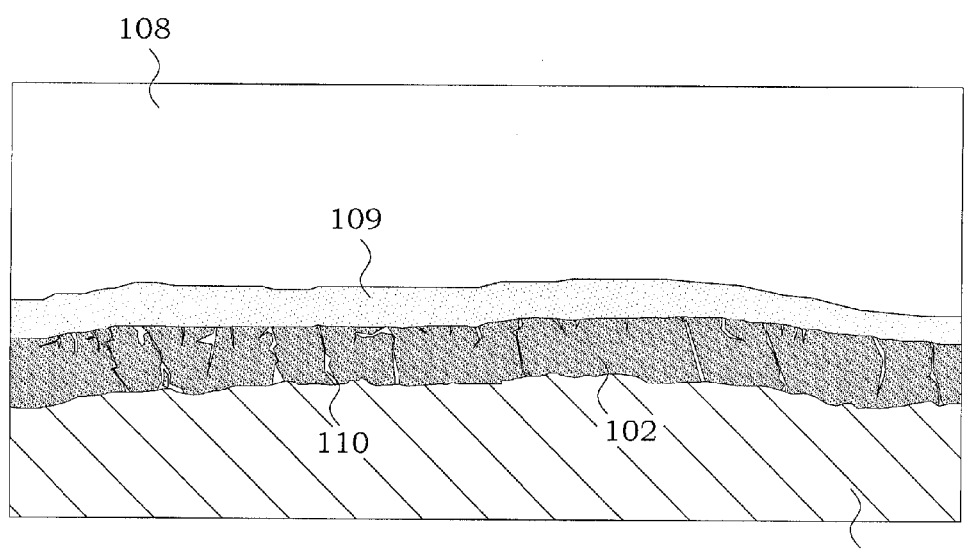
FIG. 2 is an illustration of an ITO surface partially covered by an electrochromic compound with an ultra sound soldering on top.

The result is schematically illustrated in FIG. 2. A layer of solder material 108 is provided on top of the electrochromic oxide by means of ultrasonic soldering. The vertical portion 109 of the solder material is in the figure emphasized by a point hatching. Here the cracks are filled 110 with solder, which thus constitutes a continuous conducting path through the electrochromic oxide 102.

It is also possible that the ultrasonic waves themselves additionally contribute to an additional cracking of the electrochromic oxide or counter electrode oxide. Such an action will then increase the number of possible conducting channels through the oxides, and thereby increasing the total conductivity. Also the emitted heat and the mechanical handling stresses from the process itself may contribute to additional cracking.

Figure 3:
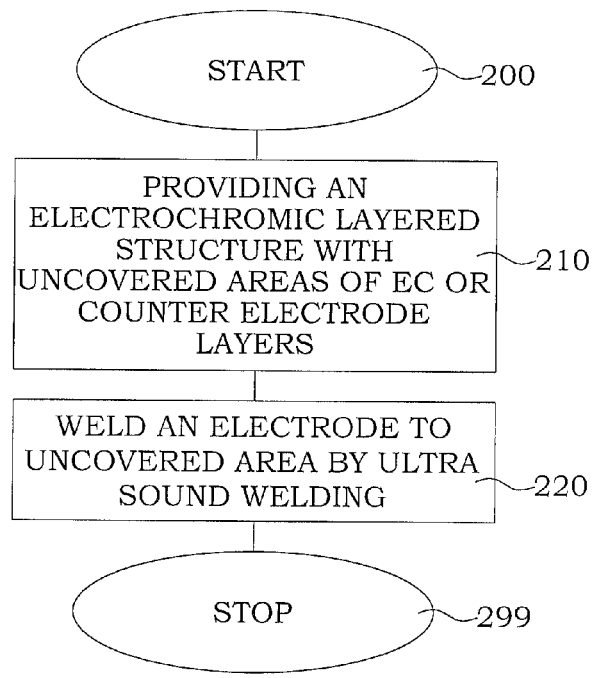
FIG. 3 is a flow diagram of steps of an embodiment of a method for producing an electrochromic device.

FIG. 3 is a flow diagram of steps of an embodiment of a method for producing an electrochromic device. The procedure starts in step 200. In step 210, an electrochromic layered structure is provided. The electrochromic layered structure has a first substrate sheet, a second substrate sheet, a first electron conducting layer at least partially covering the first substrate sheet, a second electron conducting layer at least partially covering the second substrate sheet, an electrochromic layer at least partially covering the first electron conducting layer, a counter electrode layer at least partially covering the second electron conducting layer, and an electrolyte layer laminated between and at least partially covering the first electrochromic layer and the counter electrode layer. The provision of an electrochromic layer structure, as such, is known from prior art. The details of how the manufacturing is made are in general not particularly important for the present ideas. Therefore, only parts that are of particular importance for the present disclosed ideas are further discussed. The electrochromic layered structure has a first area in which the electrochromic layer is not covered by the electrolyte layer and/or a second area in which said counter electrode layer is not covered by said electrolyte layer. In step 220, an electrode is soldered, by ultra sound soldering, to the first electron conducting layer in the first area through the electrochromic layer or to the second electron conducting layer in the second area through the counter electrode layer. The procedure ends in step 299.

The provision of an electrochromic layer structure, as such, is known from prior art. The electrochromic layer structure may be of many different kinds, e.g. it can be based on glass substrates or on polymer substrates. The electrochromic layer structure may also be e.g. laminated into different types of glass pane products. The details of how the manufacturing of the actual electrochromic layer structure is made are in general not particularly important for the present ideas, if not discussed separately further below. However, in order to make the manufacturing information complete, one possible example of a way to accomplish the provision of the electrochromic layer structure is given here below. However, anyone skilled in the art realizes that the present ideas are not limited to this particular electrochromic layer structure, but is applicable also to alternative ways of providing the electrochromic layer structure.

A substrate sheet of PET is provided. The PET sheet is coated by ITO by sputtering deposition, thereby providing the substrate with a conducting layer. The ITO covered PET is split into two parts. One part is moved through a sputter equipment arranged for sputtering a layer of electrochromic NiO, to be used as counter electrode, on the ITO in a continuous sputtering process. The ITO of the other part is moved through the sputter equipment, now arranged for sputtering a layer of electrochromic WO on the ITO in a continuous sputtering process. These two sputtering processes can also be performed simultaneously in two parallel process lines. Two entities of covered ITO on PET are thus produced, each one suitable as a half cell in an electrochromic layered structure. The half-cell entities are provided to a laminator. Electrolyte is provided from an electrolyte source into the space between the coated PET substrates and the coated PET substrates and electrolyte are laminated together creating an electrochromic layered structure. The lamination can also be followed by post-treatment, providing e.g. structural supporting features, curing and/or sealing.

Electrodes are needed to both electron conducting layers in order to provide the current to the electrochromic layer by means of an applied voltage across the electrochromic layer structure. The electrodes may be attached in different ways. However, in a preferred embodiment, electrodes are soldered to the respective electron conducting layers below both the electrochromic layer and counter electrode layer, respectively. In other words, the soldering step comprises soldering, by ultra sound soldering, of an electrode to the first electron conducting layer in the first area through the electrochromic layer and soldering, by ultra sound soldering, of an electrode to the second electron conducting layer in the second area through the counter electrode layer.

In a preferred embodiment, at least one of the electrodes comprises a conducting tape.

In one embodiment, the non-covered areas of the electrochromic layered structure are created after the lamination of the main electrochromic layered structure. In other words, an electrochromic layered structure without the first area and the second area is first provided. Thereafter, the first area and/or the second areas are created. In other words, a part of the second substrate sheet, the second electron conducting layer, the counter electrode layer and the electrolyte is removed, thereby uncovering the first area and/or a part of the first substrate sheet, the first electron conducting layer, the electrochromic layer and the electrolyte is removed, thereby uncovering the second area.

The actual removal of the portions of the respective half-cells may be performed in different manners. In one embodiment, the removal is mainly mechanical. A cut around a portion in the lateral direction of the half-cell, is then provided down through the half-cell down to the electrolyte layer and due to the limited adhesion provided by the electrolyte layer, the cut-out portion of the half-cell is easily removed. This cut can be performed by high-precision control of e.g. a doctor's blade. Any remaining electrolyte is then cleaned off e.g. by wiping with a cloth and/or washing with a solvent. In an alternative embodiment, a similar cut can be performed in different manners, e.g. by use of laser ablation or laser cutting. In further alternative embodiments, different types of etching can be performed.

Figure 4:
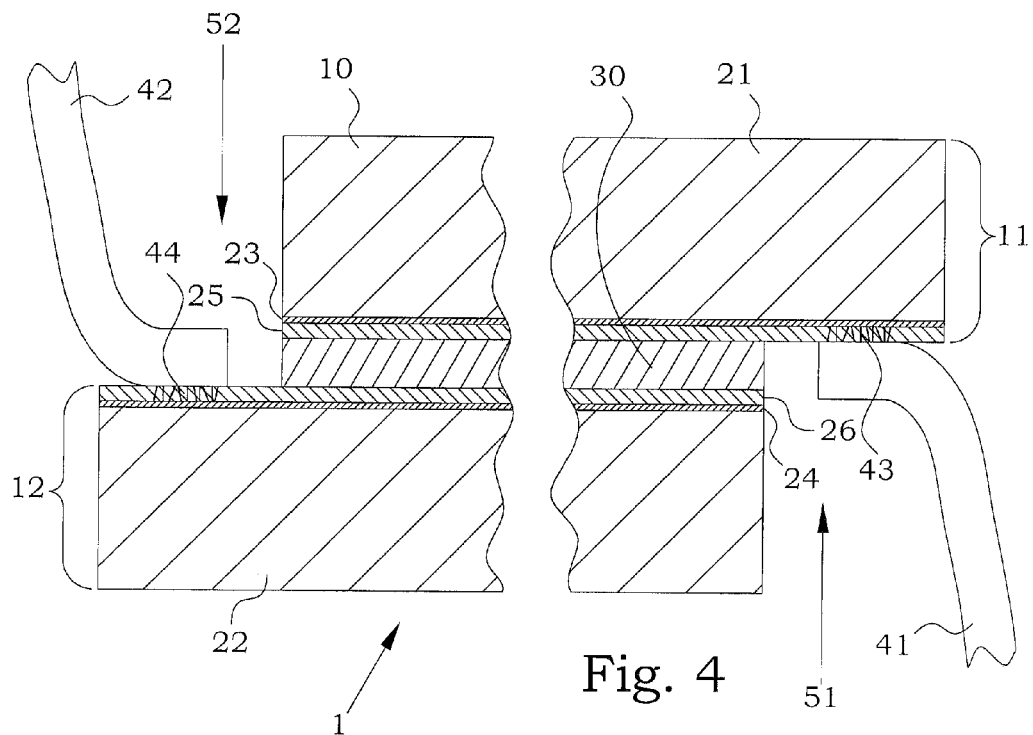
FIG. 4 is a schematic illustration of an embodiment of an electrochromic device produced by a method according to FIG. 3.

FIG. 4 illustrates a schematic illustration of an embodiment of an electrochromic device 1 manufactured according to the ideas presented above. The electrochromic device 1 comprises an electrochromic layered structure 10. The electrochromic layered structure 10 has a first substrate sheet 21 and a second substrate sheet 22. A first electron conducting layer 23 covers the first substrate sheet 21, at least partially. A second electron conducting layer 24 covers the second substrate sheet 22, at least partially. An electrochromic layer 25 covers the first electron conducting layer 23, at least partially. A counter electrode layer 26 covers the second electron conducting layer 24, at least partially. The counter electrode layer 26 may in particular embodiments also comprise electrochromic material. The first substrate sheet 21, the first electron conducting layer 23 and the electrochromic layer 25 together form a first half-cell 11 of the electrochromic structure 10. The second substrate sheet 22, the second electron conducting layer 24 and the counter electrode layer 26 together form a second half-cell 12 of the electrochromic structure 10. An electrolyte layer 30 is laminated between the first half-cell 11 and the second half-cell 12. In other words, the electrolyte layer 30 laminated between and at least partially covering the first electrochromic layer 25 and the counter electrode layer 26.

In the embodiment of FIG. 4, the electrochromic layered structure 10 has a first area 51 in which the electrochromic layer 25 is not covered by the electrolyte layer 30. Likewise, the electrochromic layered structure 10 has a second area 52 in which the counter electrode layer 26 is not covered by the electrolyte layer 30. A first electrode 41 is soldered to the first electron conducting layer 23 in the first area 51 through, as indicated by the filled cracks 43, the electrochromic layer 25. A second electrode 42 is soldered to the second electron conducting layer 24 in the second area 52 through, as indicated by the filled cracks 44, the counter electrode layer 26.

In one alternative embodiment, only the first area is present. The first electrode can thereby be attached as above. A second electrode is in such an embodiment attached to the second electron conducting layer in another way. In another embodiment, only the second area is present. The second electrode can thereby be attached as above. A first electrode is in such an embodiment attached to the first electron conducting layer in another way.

A number of different solders typically used for ultrasonic soldering have been explored for use in the present processes. A contact has been able to be established through an electrochromic layer with all tested solders. However, in some cases, an adaptation of the soldering parameters, such as power, frequency etc. had to be performed in order to achieve an acceptable contact. Such adaptations follow a normal procedure for anyone skilled in the art and are therefore not further discussed. As a general trend, it seemed that it was easier to find optimum parameters or at least acceptable parameters for solders having good wetting properties. The most advantageous choices of solders among the group of tested solders were solders comprising In, and preferably more than 10% by weight of In.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:
1. A method for producing an electrochromic device, comprising the steps of:

providing a layered structure, having a first substrate sheet, a second substrate sheet, a first electron conducting layer at least partially covering said first substrate sheet, a second electron conducting layer at least partially covering said second substrate sheet, an electrochromic layer at least partially covering said first electron conducting layer, a counter electrode layer at least partially covering said second electron conducting layer, and an electrolyte layer laminated between and at least partially covering said first electrochromic layer and said counter electrode layer;

said layered structure having at least one of:
  a first area in said layered structure in which said electrochromic layer is not covered by said electrolyte layer; and
  a second area in said layered structure in which said counter electrode layer is not covered by said electrolyte layer; and at least one of:
  soldering, by ultra sound soldering, a first electrode, provided on top of said electrochromic layer in said first area, to said first electron conducting layer through said electrochromic layer; and
  soldering, by ultra sound soldering, a second electrode, provided on top of said counter electrode layer in said second area, to said second electron conducting layer through said counter electrode layer.

2. The method according to claim 1, wherein said soldering comprises soldering, by ultra sound soldering, of the first electrode, provided on top of said electrochromic layer in said first area, to said first electron conducting layer through said electrochromic layer and soldering, by ultra sound soldering, of the second electrode, provided on top of said counter electrode layer in said second area, to said second electron conducting layer in said second area through said counter electrode layer.

3. The method according to claim 2, wherein said step of providing a layered structure, comprises:
  providing of a layered structure without said first area and said second area; and at least one of:
  removing a part of said second substrate sheet, said second electron conducting layer, said counter electrode layer and said electrolyte, thereby uncovering said first area; and
  removing a part of said first substrate sheet, said first electron conducting layer, said electrochromic layer and said electrolyte, thereby uncovering said second area.

4. The method according to claim 1, wherein said soldering is performed using a solder comprising In.

5. The method according to claim 4, wherein said solder comprises In in an amount exceeding 10% by weight.

6. The method according to claim 5, wherein said step of providing a layered structure, comprises:
  providing of a layered structure without said first area and said second area; and at least one of:
  removing a part of said second substrate sheet, said second electron conducting layer, said counter electrode layer and said electrolyte, thereby uncovering said first area; and
  removing a part of said first substrate sheet, said first electron conducting layer, said electrochromic layer and said electrolyte, thereby uncovering said second area.

7. The method according to claim 4, wherein said step of providing a layered structure, comprises:
  providing of a layered structure without said first area and said second area; and at least one of:
  removing a part of said second substrate sheet, said second electron conducting layer, said counter electrode layer and said electrolyte, thereby uncovering said first area; and
  removing a part of said first substrate sheet, said first electron conducting layer, said electrochromic layer and said electrolyte, thereby uncovering said second area.

8. The method according to claim 1, wherein at least one of said electrodes comprises a conducting tape.

9. The method according to claim 8, wherein said step of providing a layered structure, comprises:
  providing of a layered structure without said first area and said second area; and at least one of:
  removing a part of said second substrate sheet, said second electron conducting layer, said counter electrode layer and said electrolyte, thereby uncovering said first area; and
  removing a part of said first substrate sheet, said first electron conducting layer, said electrochromic layer and said electrolyte, thereby uncovering said second area.

10. The method according to claim 1, wherein said step of providing a layered structure, comprises:
  providing of a layered structure without said first area and said second area; and at least one of:
  removing a part of said second substrate sheet, said second electron conducting layer, said counter electrode layer and said electrolyte, thereby uncovering said first area; and
  removing a part of said first substrate sheet, said first electron conducting layer, said electrochromic layer and said electrolyte, thereby uncovering said second area.

11. An electrochromic device, comprising:
  a layered structure, having:
    a first substrate sheet;
    a second substrate sheet;
    a first electron conducting layer at least partially covering said first substrate sheet;
    a second electron conducting layer at least partially covering said second substrate sheet;
    an electrochromic layer at least partially covering said first electron conducting layer;
    a counter electrode layer at least partially covering said second electron conducting layer; and
    an electrolyte layer laminated between and at least partially covering said electrochromic layer and said counter electrode layer;
  said layered structure having at least one of:
    a first area in said layered structure in which said electrochromic layer is not covered by said electrolyte layer; and
    a second in said layered structure area in which said counter electrode layer is not covered by said electrolyte layer; and
  wherein at least one of:
    a first electrode is provided on top of said electrochromic layer in said first area and is soldered to said first electron conducting layer through said electrochromic layer; and
    a second electrode is provided on top of said counter electrode layer in said second area and is soldered to said second electron conducting layer through said counter electrode layer.

12. The electrochromic device according to claim 11, wherein the first electrode is provided on top of said electrochromic layer in said first area and is soldered to said first electron conducting layer through said electrochromic layer, and the second electrode is provided on top of said counter electrode layer in said second area and is soldered to said second electron conducting layer through said counter electrode layer.

13. The electrochromic device according to claim 12, wherein at least one of said first and second electrodes is soldered by a solder comprising In.

14. The electrochromic device according to claim 13, wherein said solder comprises In in an amount exceeding 10% by weight.

15. The electrochromic device according to claim 12, wherein at least one of said first electrode and said second electrode comprises a conducting tape.

16. The electrochromic device according to claim 11, wherein at least one of said first and second electrodes is soldered by a solder comprising In.

17. The electrochromic device according to claim 16, wherein said solder comprises In in an amount exceeding 10% by weight.

18. The electrochromic device according to claim 17, wherein at least one of said first electrode and said second electrode comprises a conducting tape.

19. The electrochromic device according to claim 16, wherein at least one of said first electrode and said second electrode comprises a conducting tape.

20. The electrochromic device according to claim 11, wherein at least one of said first electrode and said second electrode comprises a conducting tape.

* * * * *

UNITED STATES PATENT AND TRADEMARK OFFICE
CERTIFICATE OF CORRECTION

PATENT NO. : 9,778,531 B2
APPLICATION NO. : 14/906398
DATED : October 3, 2017
INVENTOR(S) : Greger Gregard et al.

It is certified that error appears in the above-identified patent and that said Letters Patent is hereby corrected as shown below:

In the Claims

Claim 1, Column 7, Line 10, delete "first".

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*